(12) United States Patent
Kitamura (10) Patent No.: US 9,156,327 B2
(45) Date of Patent: Oct. 13, 2015

(54) SUSPENSION DEVICE

(71) Applicant: KAYABA INDUSTRY CO., LTD., Tokyo (JP)

(72) Inventor: Yasuhiro Kitamura, Aichi (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/391,622

(22) PCT Filed: Apr. 17, 2013

(86) PCT No.: PCT/JP2013/061380
§ 371 (c)(1),
(2) Date: Oct. 9, 2014

(87) PCT Pub. No.: WO2013/161641
PCT Pub. Date: Oct. 31, 2013

(65) Prior Publication Data
US 2015/0101900 A1  Apr. 16, 2015

(30) Foreign Application Priority Data

Apr. 27, 2012 (JP) .................................. 2012-102761
Feb. 20, 2013 (JP) .................................. 2013-030770

(51) Int. Cl.
*B60G 13/08* (2006.01)
*F16F 9/06* (2006.01)
*F16F 9/18* (2006.01)

(52) U.S. Cl.
CPC .............. *B60G 13/08* (2013.01); *F16F 9/063* (2013.01); *B60G 2202/24* (2013.01); *F16F 9/185* (2013.01)

(58) Field of Classification Search
CPC ..... B60G 13/08; B60G 2202/24; F16F 9/063; F16F 9/182; F16F 9/185; B62K 25/06; B62K 2201/08
See application file for complete search history.

(56) References Cited

U.S. PATENT DOCUMENTS

| 2009/0261555 A1* | 10/2009 | Tomiuga ................ | B62K 25/08 280/279 |
| 2012/0187640 A1* | 7/2012 | Kondo ................... | B60G 11/58 280/5.514 |
| 2012/0205843 A1* | 8/2012 | Allen ..................... | B60G 15/12 267/64.25 |

FOREIGN PATENT DOCUMENTS

| JP | H01-266332 A | 10/1989 |
| JP | 09-217780 A | 8/1997 |
| JP | 2001-263406 A | 9/2001 |
| JP | 2002-130356 A | 5/2002 |
| JP | 2008-240840 A | 10/2008 |

* cited by examiner

*Primary Examiner* — Vishal Sahni
(74) *Attorney, Agent, or Firm* — Rabin & Berdo, P.C.

(57) ABSTRACT

A suspension device includes a partition wall body which partitions the outside of a hollow pipe into a working chamber and a reservoir first chamber, a first piston which partitions the working chamber into an extension-side first chamber and a contraction-side first chamber, a first flow passage which allows communication between the extension-side first chamber and the reservoir first chamber, an extension-side second chamber which communicates with the extension-side first chamber, a second piston which partitions the interior of the hollow pipe into a contraction-side second chamber and a reservoir second chamber, a first damping flow passage which allows communication between an extension-side chamber and a contraction-side chamber, and a second damping flow passage which allows communication between the contraction-side chamber and a reservoir. A cross-sectional area of the extension-side second chamber is larger than that of the hollow pipe.

4 Claims, 7 Drawing Sheets

FIG. 7

SUSPENSION DEVICE

TECHNICAL FIELD

The present invention relates to an improvement in a suspension device.

BACKGROUND ART

In transportation equipment such as automotive vehicles and motorcycles, a suspension device is interposed between a vehicle body and a wheel. The suspension device suppresses the transmission of an impact due to the unevenness of a road surface to the vehicle body.

Figure 6:
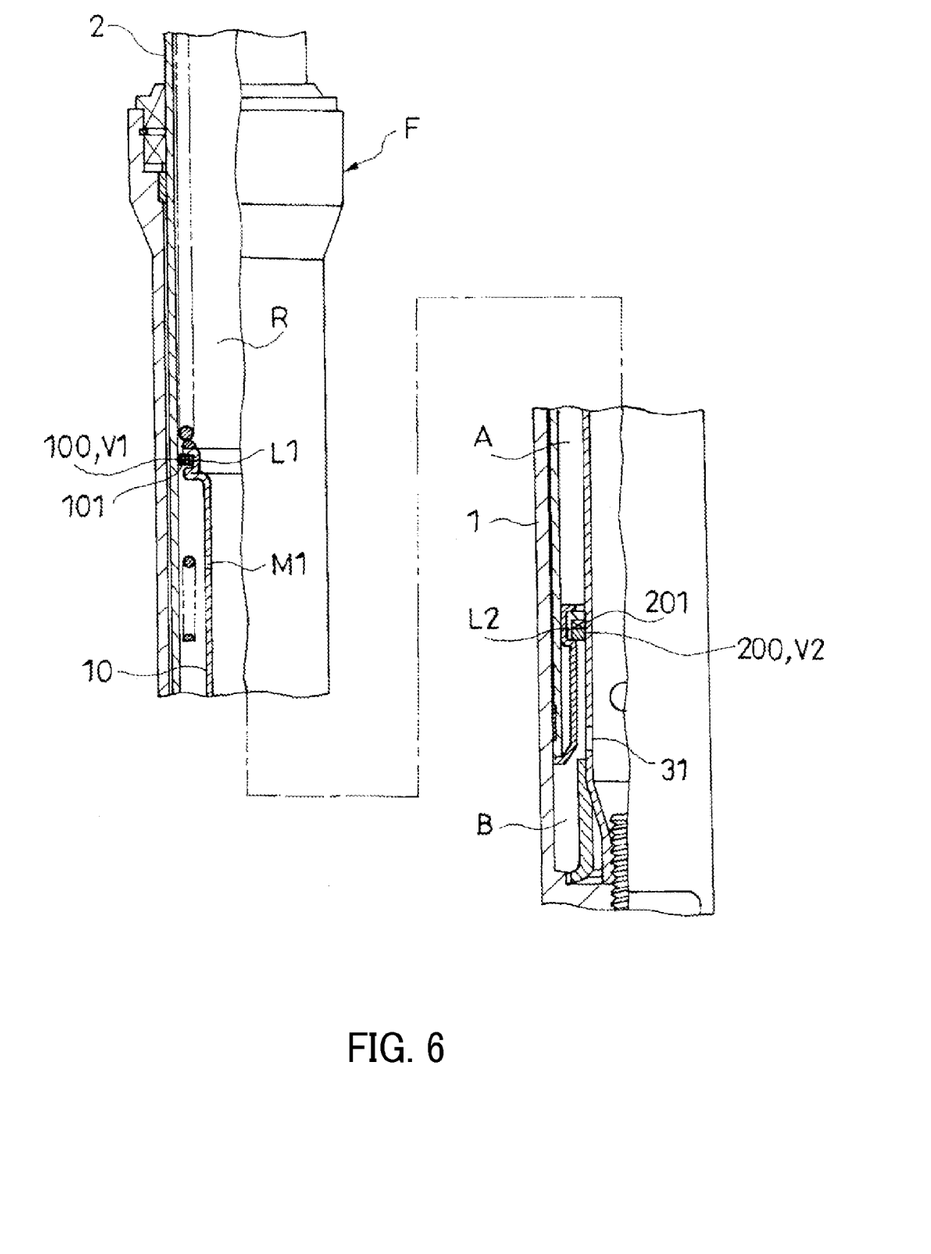
FIG. 6 is a front view, partly cut away, showing a conventional suspension device.

JP9-217780A discloses a front fork as a suspension device for suspending a front wheel of a motorcycle. This suspension device is an upright suspension device and includes a suspension device main body F composed of an outer tube 1 which is to be coupled to a wheel side and an inner tube 2 which is to be coupled to a vehicle body side and a tip side of which is retractably inserted into the outer tube 1 as shown in FIG. 6.

The suspension device includes a hollow pipe 10 a base end side of which is coupled to the outer tube 1 and a tip side of which enters and exits from the inner tube 2 as the suspension device main body F extends and contracts, a partition wall body 100 which is held on the outer periphery of a tip part of the hollow pipe 10 and slides in contact with the inner peripheral surface of the inner tube 2, and a piston 200 which is held on the inner periphery of a tip part of the inner tube 2 and slides in contact with the outer peripheral surface of the hollow pipe 10.

The partition wall body 100 partitions the outside of the hollow pipe 10 into a working chamber (not shown) which is formed on the outer periphery of the hollow pipe 10 and filled with working fluid and a reservoir R which is formed inside and above the hollow pipe 10 and in which the working fluid and gas are stored. The piston 200 partitions the working chamber into an extension-side chamber A on the inner tube side (upper side in FIG. 6) and a contraction-side chamber B. The extension-side chamber A communicates with the reservoir R via a damping flow passage M1 formed by an orifice perforated on the tip side (upper side in FIG. 6) of the hollow pipe 10. The contraction-side chamber B communicates with the reservoir R via a hole 31 perforated on the base end side (lower side in FIG. 6) of the hollow pipe 10.

The partition wall body 100 and the piston 200 are each formed into an annular shape and mounted movably in an axial direction. A first flow passage L1 allowing communication between the reservoir R and the extension-side chamber A is provided on the inner periphery of the partition wall body 100. A second flow passage L2 allowing communication between the extension-side chamber A and the contraction-side chamber B is provided on the outer periphery of the piston 200.

A cut 101 is formed along a radial direction on an extension-side chamber side surface (lower surface in FIG. 6) of the partition wall body 100. Accordingly, the partition wall body 100 functions as a first check valve V1 for permitting the working fluid passing in the first flow passage L1 to move only from the reservoir R to the extension-side chamber A. On the other hand, a cut 201 is formed along a radial direction on an extension-side chamber side surface (upper surface in FIG. 6) of the piston 200. Accordingly, the piston 200 functions as a second check valve V2 for permitting the working fluid passing in the second flow passage L2 to move only from the contraction-side chamber B to the extension-side chamber A.

When the suspension device extends, the extension-side chamber A is pressurized and the contraction-side chamber B is depressurized by the piston 200. At this time, communication between the first and second flow passages L1, L2 is blocked by the partition wall body 100 functioning as the first check valve V1 and the piston 200 functioning as the second check valve V2. Thus, the working fluid in the extension-side chamber A flows out to the reservoir R through the damping flow passage M1 of the hollow pipe 10 and the working fluid in the reservoir R flows into the contraction-side chamber B through the communication hole 31.

When the suspension device contracts, the contraction-side chamber B is pressurized and the extension-side chamber A is depressurized by the piston 200. At this time, the communication between the first and second flow passages L1, L2 is permitted by the partition wall body 100 functioning as the first check valve V1 and the piston 200 functioning as the second check valve V2. Thus, the working fluid in the contraction-side chamber B flows out to the reservoir R and the extension-side chamber A through the communication hole 31 of the hollow pipe 10 and second flow passage L2, and the working fluid in the reservoir R flows into the extension-side chamber A through the first flow passage L1 and the damping flow passage M1.

Accordingly, the suspension device generates a damping force due to resistance produced when the working fluid passes through the first flow passage L1, the second flow passage L2, the damping flow passage M1 and the communication hole 31 as the suspension device main body F extends and contracts. Further, an extension-side damping force which is a damping force when the suspension device extends is larger as compared with a contraction-side damping force which is a damping force when the suspension device contracts.

Further, in the above suspension device, the partition wall body 100 partitioning between the reservoir R and the extension-side chamber A and the piston 200 partitioning between the extension-side chamber A and the contraction-side chamber B are arranged between the inner periphery of the inner tube 2 and the outer periphery of the hollow pipe 10 and each formed into an annular shape. Since the partition wall body 100 and the piston 200 are mounted movably in the axial direction and function as the first and second check valves V1, V2 by each including the cut 101, 201 on one surface, a leaf valve can be eliminated.

Thus, the above suspension device can be easily assembled and inexpensively manufactured as compared with a suspension device for generating a damping force utilizing a deflection characteristic of a leaf valve.

SUMMARY OF INVENTION

Figure 7:
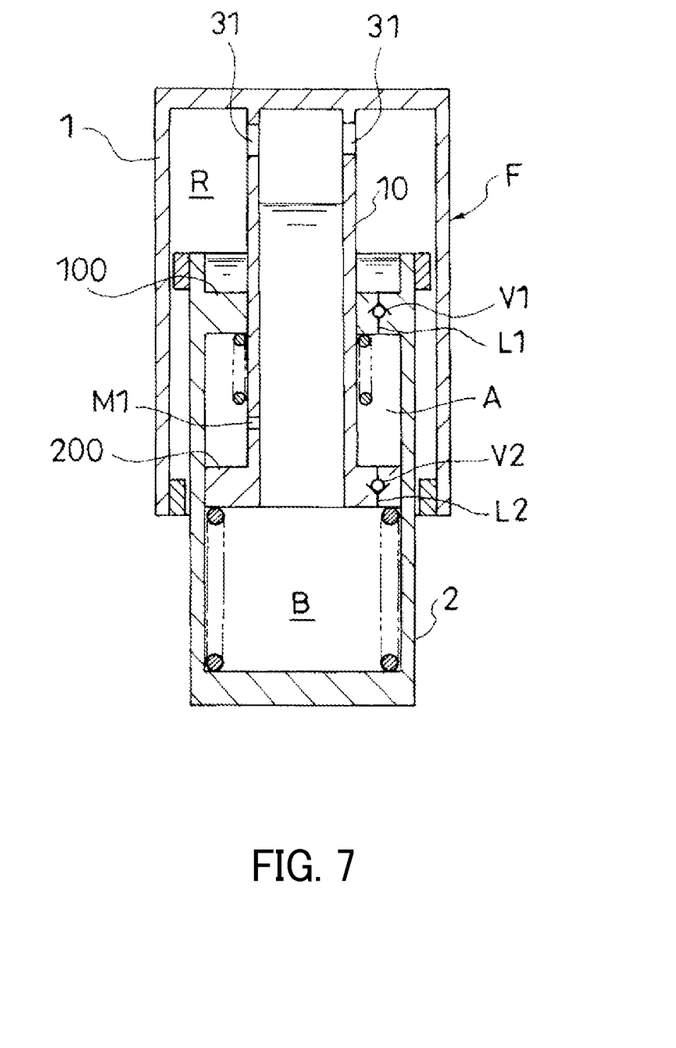
FIG. 7 is a vertical sectional view showing a structure in a simplified manner when the conventional suspension device is used as an inverted suspension device.

Here, the suspension device may be used as an inverted suspension device because of strength securement, design or the like. In the case of changing the above conventional suspension device into an inverted suspension device, the reservoir R and the contraction-side chamber B face each other via the fluid surface of the working fluid in the hollow pipe 10 as shown in FIG. 7. Further, the partition wall body 100 partitioning between the reservoir R and the extension-side chamber A is held on the inner periphery of the inner tube 2 and slides in contact with the outer peripheral surface of the hollow pipe 10. Furthermore, the piston 200 partitioning between the extension-side chamber A and the contraction-side chamber B is held on the outer periphery of the hollow pipe 10 and slides in contact with the inner peripheral surface of the inner tube 2.

In this case, when the suspension device extends, the suspension device can generate an extension-side damping force as in the case of being used as the upright suspension device. However, since a differential pressure between the contraction-side chamber B and the reservoir R is very small when the suspension device contracts, the suspension device cannot generate a sufficient contraction-side damping force and the contraction-side damping force becomes insufficient.

The present invention aims to suppress a shortage of a contraction-side damping force when a suspension device enabling the elimination of a leaf valve is used as an inverted suspension device.

According to one aspect of the present invention, a suspension device with a telescopic suspension device main body including an outer tube which is to be coupled to a vehicle body side and an inner tube which is to be coupled to a wheel side and a tip side of which is retractably inserted into the outer tube is provided. The suspension device includes a hollow pipe a base end side of which is coupled to the outer tube and a tip side of which enters and exits from the inner tube as the suspension device main body contracts and extends, a partition wall body which is held on the inner periphery of the tip side of the inner tube, slides in contact with the outer peripheral surface of the hollow pipe, and partitions the outside of the hollow pipe into a working chamber which is filled with working fluid and formed inside the inner tube and a reservoir first chamber in which the working fluid is stored, a first piston which is held on the outer periphery of the tip side of the hollow pipe, slides in contact with the inner peripheral surface of the inner tube and partitions the working chamber into an extension-side first chamber on a hollow pipe side and a contraction-side first chamber, a first flow passage which allows communication between the extension-side first chamber and the reservoir first chamber, a first check valve which opens the first flow passage only when the working fluid moves from the reservoir first chamber to the extension-side first chamber, an extension-side second chamber which is formed between the outer tube and the inner tube in an overlapping part of the outer tube and the inner tube, is filled with the working fluid, communicates with the extension-side first chamber and expands and shrinks as the suspension device main body contracts and extends, a rod a base end side of which is coupled to the inner tube and a tip side of which enters and exits from the hollow pipe as the suspension device main body contracts and extends, a second piston which is held on the outer periphery of the tip side of the rod and partitions the interior of the hollow pipe into a contraction-side second chamber which is filled with the working fluid and communicates with the contraction-side first chamber and a reservoir second chamber in which the working fluid is stored and which communicates with the reservoir first chamber, a first damping flow passage which allows communication between an extension-side chamber including the extension-side first chamber and the extension-side second chamber and a contraction-side chamber including the contraction-side first chamber and the contraction-side second chamber and applies resistance when the working fluid passes, and a second damping flow passage which allows communication between the contraction-side chamber and a reservoir including the reservoir first chamber and the reservoir second chamber and applies resistance when the working fluid passes, a cross-sectional area of the extension-side second chamber being larger than that of the hollow pipe.

The details as well as other features and advantages of the present invention are set forth in the remainder of the specification and are shown in the accompanying drawings.

DESCRIPTION OF EMBODIMENTS

Hereinafter, an embodiment of the present invention is described with reference to the drawings. The same reference signs given through a plurality of drawings denote the same or corresponding components.

Figure 1:
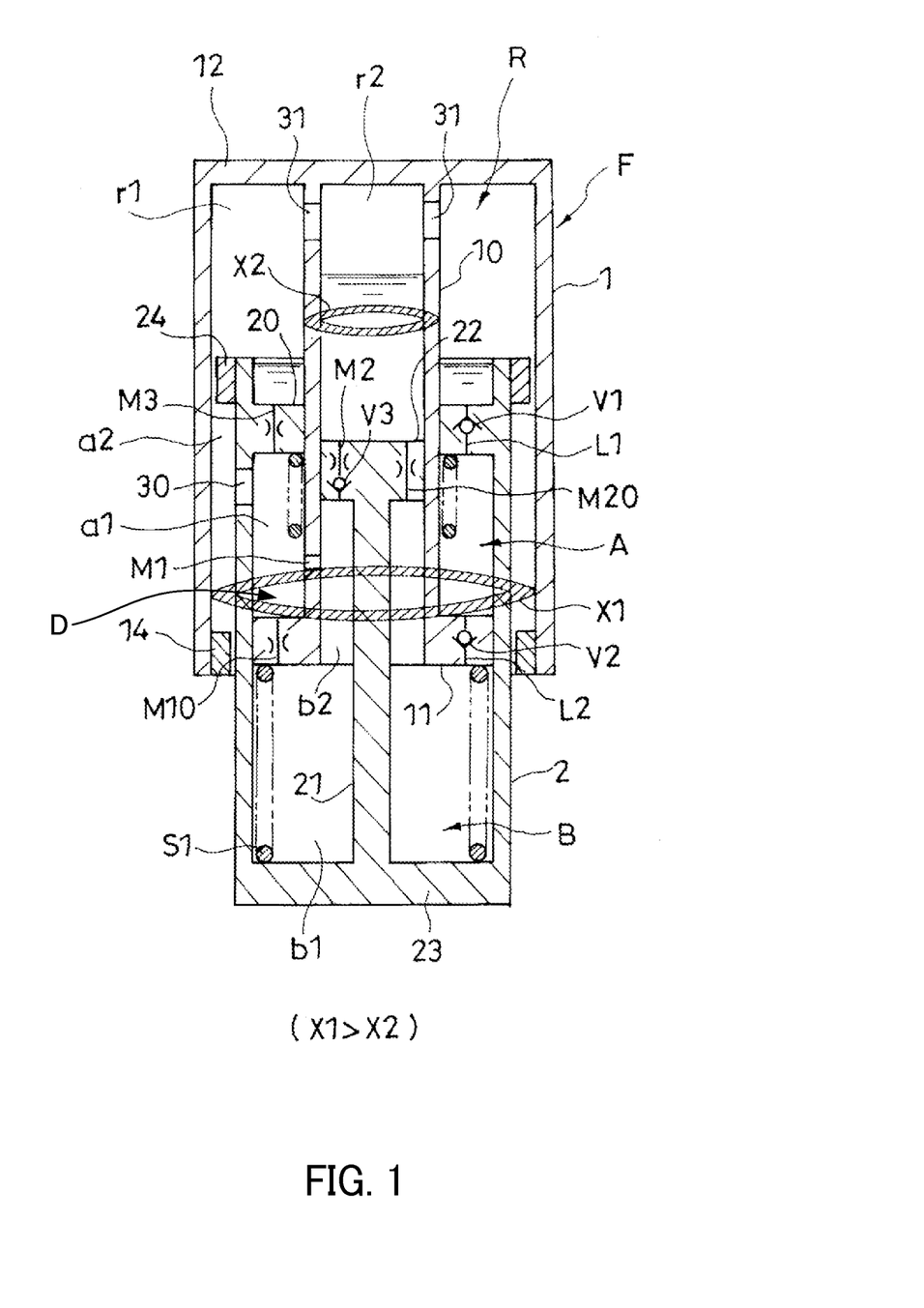
FIG. 1 is a vertical sectional view showing a suspension device according to an embodiment of the present invention in a simplified manner.

FIG. 1 is a vertical sectional view showing a suspension device according to an embodiment in a simplified manner. The suspension device includes a telescopic suspension device main body F composed of an outer tube 1 which is to be coupled to a vehicle body side and an inner tube 2 which is to be coupled to a wheel side and a tip side of which is retractably inserted into the outer tube 1, and a hollow pipe 10 a base end side of which is coupled to the outer tube 1 and a tip side of which enters and exits from the inner tube 2 as the suspension device main body F contracts and extends.

The suspension device further includes a partition wall body 20 which is held on the inner periphery of the tip side of the inner tube 2 and slides in contact with the outer peripheral surface of the hollow pipe 10 and a first piston 11 which is held on the outer periphery of the tip side of the hollow pipe 10 and slides in contact with the inner peripheral surface of the inner tube 2.

The partition wall body 20 partitions the outside of the hollow pipe 10 into a working chamber D which is filled with working fluid and formed inside the inner tube 2 and a reservoir first chamber r1 in which the working fluid is stored. The first piston 11 partitions the working chamber D into an extension-side first chamber a1 on the hollow pipe side and a contraction-side first chamber b1.

The suspension device further includes a first flow passage L1 allowing communication between the extension-side first chamber a1 and the reservoir first chamber r1 and a first check valve V1 for opening the first flow passage L1 only when the working fluid moves from the reservoir first chamber r1 to the extension-side first chamber a1.

The suspension device further includes an extension-side second chamber a2 which is an overlapping part of the outer tube 1 and the inner tube 2 and formed between the outer tube 1 and the inner tube 2, a rod 21 a base end side of which is coupled to the inner tube 2 and a tip side of which enters and exits from the hollow pipe 10 as the suspension device main body F contacts and extends, and a second piston 22 held on the outer periphery of the tip side of the rod 21.

The extension-side second chamber a2 is filled with the working fluid and communicates with the extension-side first chamber a1 and, as the suspension device main body F extends and contracts, shrinks and expands. The second piston 22 partitions the interior of the hollow pipe 10 into a contraction-side second chamber b2 which is filled with the working fluid and communicates with the contraction-side first chamber b1 and a reservoir second chamber r2 in which the working fluid is stored and which communicates with the reservoir first chamber r1.

In the suspension device, an extension-side chamber A is formed by the extension-side first chamber a1 and the extension-side second chamber a2, a contraction-side chamber B is formed by the contraction-side first chamber b1 and the contraction-side second chamber b2, and a reservoir R is formed by the reservoir first chamber r1 and the reservoir second chamber r2. The suspension device further includes first damping flow passages M1, M10 which allow communication between the extension-side chamber A and the contraction-side chamber B and apply resistance when the working fluid passes, and second damping flow passages M2, M20 which allow communication between the contraction-side chamber B and the reservoir R and apply resistance when the working fluid passes. A cross-sectional area X1 of the extension-side second chamber a2 is set to be larger than a cross-sectional area X2 of the hollow pipe 10 (X1>X2).

Figure 2:
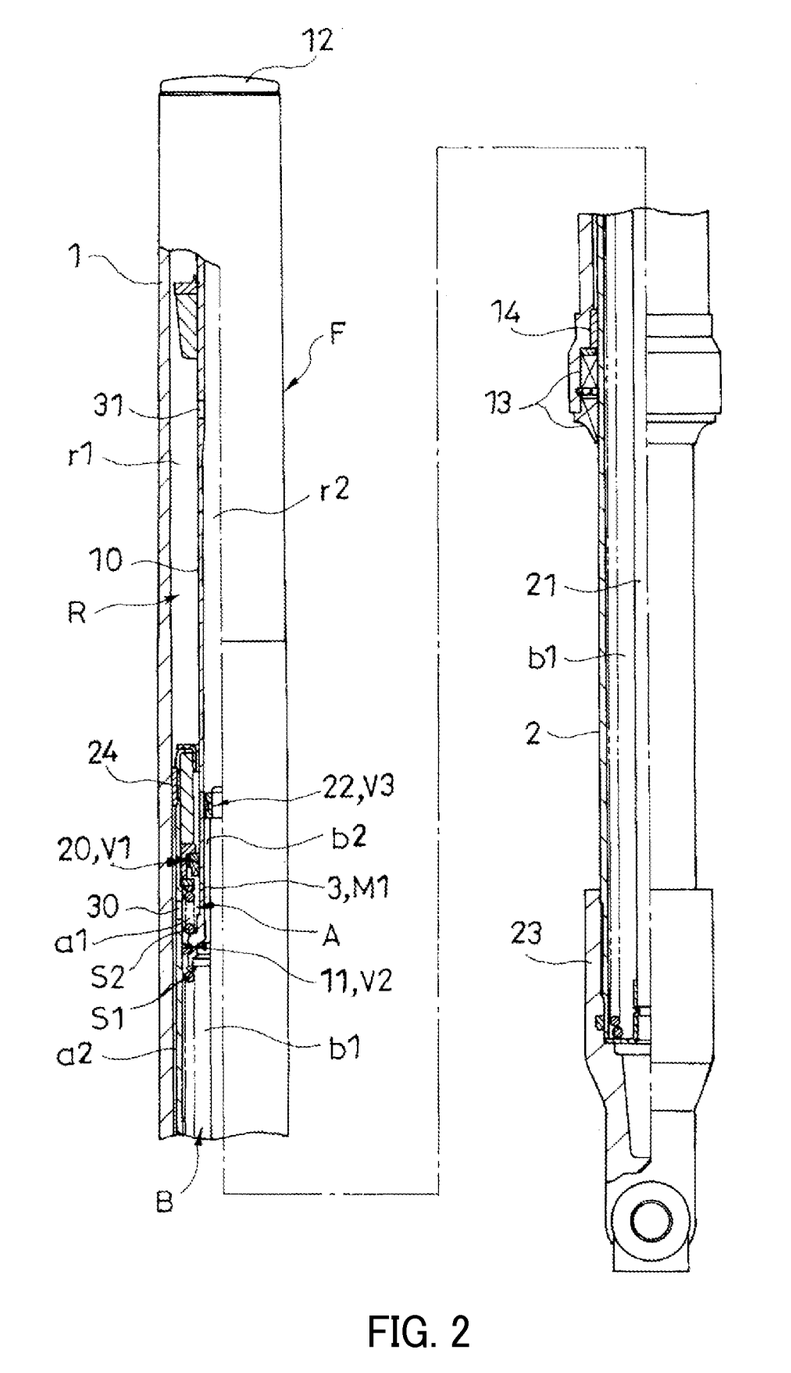
FIG. 2 is a front view, partly cut away, showing the suspension device according to the embodiment of the present invention.

FIG. 2 is a front view, partly cut away, showing the suspension device in the present embodiment. The suspension device is an inverted front fork for suspending a front wheel of a saddled vehicle such as a motorcycle and includes the suspension device main body F composed of the outer tube 1 to be coupled to the vehicle body side and the inner tube 2 to be coupled to the wheel side.

The inside of the suspension device main body F is partitioned from an outside air side by a cap member 12 for closing an upper opening of the outer tube 1 in FIG. 2, a bottom member 23 for closing a lower opening of the inner tube 2 in FIG. 2 and a seal member 13 for closing a lower opening of a tubular clearance (not shown) in FIG. 2 formed between the outer tube 1 and the inner tube 2 in the overlapping part of the outer tube 1 and the inner tube 2. This prevents the leakage of the working fluid and gas stored in the suspension device main body F to the outside air side. It should be noted that although the working fluid is liquid such as oil, water or aqueous solution, it is possible to use other various types of fluid.

In the tubular clearance, the working fluid is stored and an outer bearing 14 which is held on the inner periphery of the outer tube 1 and slides in contact with the outer peripheral surface of the inner tube 2 and an inner bearing 24 which is held on the outer periphery of the inner tube 2 and slides in contact with the inner peripheral surface of the outer tube 1 are arranged in series. The extension-side second chamber a2 filled with the working fluid is formed between the outer and inner bearings 14, 24.

At the time of the extension of the suspension device main body F during which the inner tube 2 exits from the outer tube 1, the outer and inner bearings 14, 24 come closer to each other and the extension-side second chamber a2 shrinks. On the other hand, at the time of the contraction of the suspension device main body F during which the inner tube 2 enters the outer tube 1, the outer and inner bearings 14, 24 are separated from each other and the extension-side second chamber a2 expands. That is, the extension-side second chamber a2 expands and shrinks as the suspension device main body F contracts and extends.

It should be noted that an outside air side (lower side in FIG. 2) of the extension-side second chamber a2 is closed by the seal member 13, whereas an inner side (upper side in FIG. 2) of the extension-side second chamber a2 is not completely closed since the inner bearing 24 is formed into an annular C shape including an abutment portion (not shown). Accordingly, an annular seal member (not shown) which is held on the outer periphery of the inner tube 2 and slides in contact with the inner peripheral surface of the outer tube 1 may be arranged in series with the inner bearing 24 to suppress the leakage of the working fluid through a clearance of the abutment portion of the inner bearing 24.

The hollow pipe 10 the base end side of which is coupled to the outer tube 1 and the tip side of which enters and exits from the inner tube 2 as the suspension device main body F contracts and extends stands in an axial center part of the suspension device main body F. The reservoir first chamber r1, the extension-side first chamber a1 and the contraction-side first chamber b1 are successively arranged in the axial direction from the vehicle body side (upper side in FIG. 2) inside the outer tube 1 and the inner tube 2 and the outside the hollow pipe 10. The reservoir second chamber r2 and the contraction-side second chamber b2 are successively arranged in the axial direction from the vehicle body side inside the hollow pipe 10.

The extension-side first chamber a1 communicates with the extension-side second chamber a2 via a communication hole 30 perforated on the tip side (upper side in FIG. 2) of the inner tube 2. The contraction-side first chamber b1 communicates with the contraction-side second chamber b2 via a tip side opening (lower end side opening in FIG. 2) of the hollow pipe 10. The reservoir first chamber r1 communicates with the reservoir second chamber r2 via the communication hole 31 perforated on the base end side (upper side in FIG. 2) of the hollow pipe 10.

Each of the extension-side first chamber a1, the extension-side second chamber a2, the contraction-side first chamber b1 and the contraction-side second chamber b2 is filled with the working fluid. In the reservoir first chamber r1 and the reservoir second chamber r2, the working fluid is stored and the gas is stored in sides above the fluid level of the working fluid. This enables the reservoir R to compensate for a capacity change in the suspension device main body F associated with the extension and contraction of the suspension device and a volume change of the working fluid caused by a temperature change.

Figure 3:
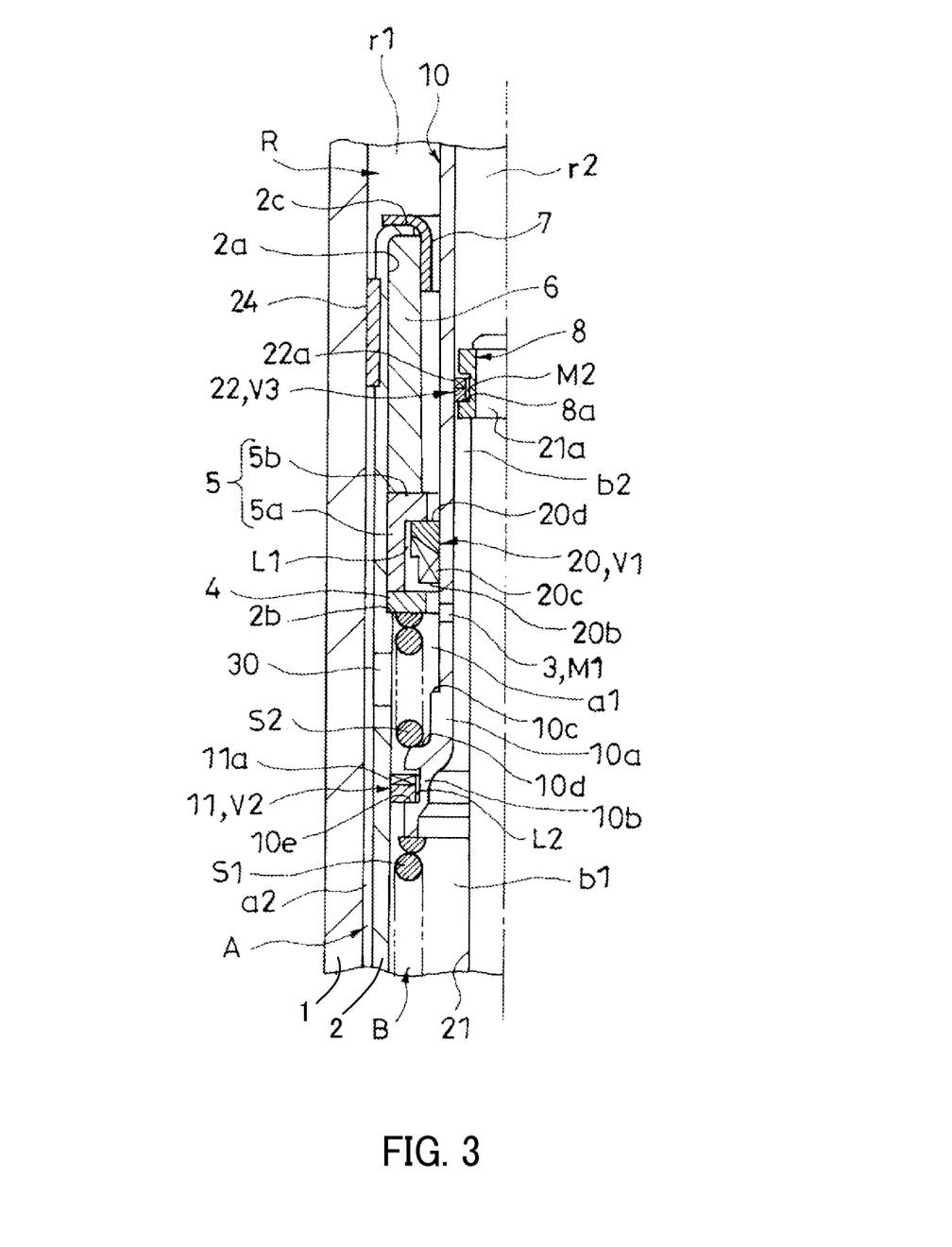
FIG. 3 is an enlarged view enlargedly showing a main part of FIG. 2.

The inner tube 2 is formed into a tubular shape, the base end side (lower side in FIG. 2) is coupled to an axle of the front wheel via the bottom member 23 and the tip side (upper side in FIG. 2) is retractably inserted between the outer tube 1 and the hollow pipe 10. As shown in FIG. 3, an inner peripheral surface 2a in a predetermined range from the tip of the inner tube 2 is formed to have a larger diameter than the inner peripheral surface of the other part, and an annular step surface 2b is formed on a boundary between these. Further, a caulked portion 2c caulked radially inward is formed on a tip part (upper end part in FIG. 3) of the inner tube 2.

Annularly formed spring seat 4, case 5 and spacer 6 are successively arranged in the axial direction from the step surface side (lower side in FIG. 3) between the inner peripheral surface 2a of the inner tube 2 and the hollow pipe 10. The spring seat 4, the case 5 and the spacer 6 are sandwiched between the step surface 2b and the caulked portion 2c of the inner tube 2. Further, an annular locking member 7 for supporting the spacer 6 from an inner peripheral side is fitted on the caulked portion 2c of the inner tube 2. A predetermined clearance in which the working fluid can pass is formed between the spring seat 4, the case 5, the spacer 6 and the locking member 7 and the hollow pipe 10.

A fully stretched spring S2 is held in a hanging state on the spring seat 4. The fully stretched spring S2 is compressed to absorb an impact by generating a predetermined reaction force when the suspension device extends most.

Figure 4A:
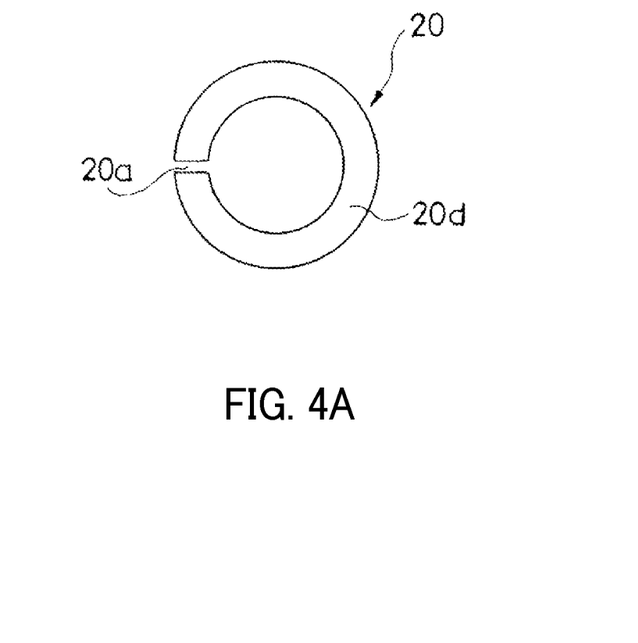
FIG. 4A is a plan view showing a partition wall body.
Figure 4B:
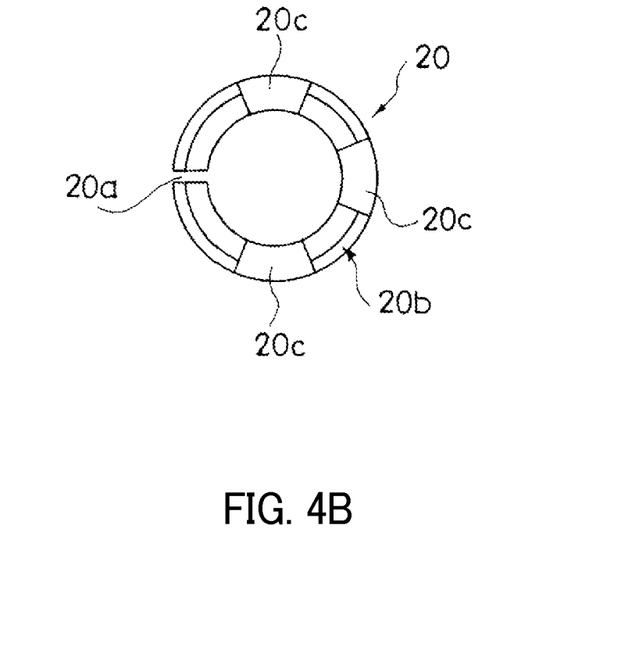
FIG. 4B is a bottom view showing a bottom surface of the partition wall body of FIG. 4A.

The case 5 includes a tubular portion 5a standing along the inner tube 2 and an annular flange portion 5b projecting from a spacer side end part (upper end part in FIG. 3) of the tubular portion 5a toward an inner peripheral side and is formed to have an inverted L-shaped cross-section. The partition wall body 20 is provided movably in the axial direction in a clearance between the tubular portion 5a and the hollow pipe 10. As shown in FIGS. 4A and 4B, the partition wall body 20 is formed into an annular C shape including an abutment portion 20a. The inner periphery of the partition wall body 20 slides in contact with the outer peripheral surface of the hollow pipe 10 to partition between the extension-side first chamber a1 and the reservoir first chamber r1. The annular first flow passage L1 is defined between the outer periphery of the partition wall body 20 and the tubular portion 5a of the case 5. Radially extending cuts 20c are formed on an extension-side first chamber side surface 20b of the partition wall body 20.

When the partition wall body 20 moves to a reservoir first chamber side (upper side in FIG. 3), a surface 20d opposite to the cuts 20c is seated on the flange portion 5b of the case 5 to close the first flow passage L1. Further, when the partition wall body 20 moves to an extension-side first chamber side (lower side in FIG. 3), the surface 20d opposite to the cuts 20c is separated from the flange portion 5b of the case 5 to open the first flow passage L1. That is, the partition wall body 20 functions as the first check valve V1 for opening the first flow passage L1 only when the working fluid moves from the reservoir first chamber r1 to the extension-side first chamber a1.

The abutment portion 20a of the partition wall body 20 functions as a third damping flow passage M3 which constantly allows the communication between the extension-side first chamber a1 and the reservoir first chamber r1 and applies resistance when the working fluid moves. It should be noted that the partition wall body 20 may be formed into an annular shape to eliminate the abutment portion 20a (third damping flow passage M3).

As shown in FIG. 2, the hollow pipe 10 is formed into a tubular shape, the base end part (upper end part in FIG. 2) is coupled to the cap member 12 and the base end side (upper side in FIG. 2) is closed by the cap member 12. That is, the hollow pipe 10 is coupled to the outer tube 1 via the cap member 12. Further, a suspension spring S1 for elastically supporting the vehicle body by constantly biasing the suspension device main body F in an extension direction is interposed between the tip (lower end in FIG. 2) of the hollow pipe 10 and the bottom member 23.

Further, as shown in FIG. 1, the cross-sectional area X2 of the hollow pipe 10 is set to be smaller than the cross-sectional area X1 of the extension-side second chamber a2 (X1>X2). It should be noted that the cross-sectional areas X1, X2 mean cut surface areas when the extension-side second chamber a2 and the hollow pipe 10 are cut in a radial direction. The cross-sectional area X2 of the hollow pipe 10 is a cross-sectional area of a part held in sliding contact with the partition wall body 20.

As shown in FIG. 3, the tip part (lower end part in FIG. 3) of the hollow pipe 10 is formed to increase an outer diameter in two stages toward the tip. That is, the tip part of the hollow pipe 10 includes a widened intermediate outer diameter portion 10a and a large outer diameter portion 10b made further wider than the intermediate outer diameter portion 10a, and an annular step surface 10c, 10d is formed on each boundary. The lower end of the fully stretched spring S2 in FIG. 3 can come into contact with the step surface 10d located on the boundary between the intermediate and large outer diameter portions 10a, 10b.

An annular groove 10e having a U-shaped cross-section is formed on the outer periphery of the large outer diameter portion 10b. The first piston 11 is provided movably in the axial direction in a clearance between the annular groove 10e and the inner tube 2. The first piston 11 is formed into an annular C shape including an abutment portion similarly to the partition wall body 20, and the outer periphery thereof slides in contact with the inner peripheral surface of the inner tube 2. The first piston 11 partitions between the extension-side first chamber a1 on a hollow pipe side (upper side in FIG. 3) and the contraction-side first chamber b1 on a side (lower side in FIG. 3) opposite to the hollow pipe 10. The annular second flow passage L2 is defined between the inner periphery of the first piston 11 and the hollow pipe 10. A radially extending cut 11a is formed on an extension-side first chamber side surface (upper side surface in FIG. 3) of the first piston 11.

When the first piston 11 moves to a contraction-side first chamber side (lower side in FIG. 3), a side surface (lower side surface in FIG. 3) opposite to the cut 11a is seated on the hollow pipe 10 to close the second flow passage L2. Further, when the first piston 11 moves to an extension-side first chamber side (upper side in FIG. 3), the side surface opposite to the cut 11a is separated from the hollow pipe 10 to open the second flow passage L2. That is, the first piston 11 functions as the second check valve V2 for opening the second flow passage L2 only when the working fluid moves from the contraction-side first chamber b1 (contraction-side chamber B) to the extension-side first chamber a1 (extension-side chamber A).

The abutment portion (not shown) of the first piston 11 functions as the first damping flow passage M10 (FIG. 1) which constantly allows the communication between the extension-side chamber A and the contraction-side chamber B and applies resistance when the working fluid moves. Further, the suspension device includes an orifice 3 perforated on the tip side (lower side in FIG. 2) of the hollow pipe 10. The orifice 3 functions as the first damping flow passage M1 (FIG. 1) which constantly allows the communication between the extension-side chamber A and the contraction-side chamber B and applies resistance when the working fluid moves. Although the suspension device includes two first damping flow passages as just described, one of the first damping flow passages M1, M10 may be omitted. For example, the first piston 11 may be formed into an annular shape to eliminate the abutment portion that serves as the first damping flow passage M10.

Next, as shown in FIG. 2, the rod 21 stands in the axial center part of the inner tube 2. The base end side (lower side in FIG. 2) of the rod 21 is coupled to the inner tube 2 via the bottom member 23 and the tip side (upper side in FIG. 2) enters and exits from the hollow pipe 10. As shown in FIG. 3, an annular case 8 is held on the outer periphery of a tip part 21a of the rod 21.

An annular groove 8a having a U-shaped cross-section is formed on the outer periphery of the case 8. The second piston 22 is provided movably in the axial direction in a clearance between the annular groove 8a and the hollow pipe 10. The second piston 22 is formed into an annular C shape including an abutment portion similarly to the partition wall body 20, and the outer periphery thereof slides in contact with the inner peripheral surface of the hollow pipe 10. The second piston 22 partitions between the contraction-side second chamber b2 on a rod side (lower side in FIG. 3) and the reservoir second chamber r2 on a side (upper side in FIG. 3) opposite to the rod 21. Further, the second damping flow passage M2 that applies resistance when the working fluid passes is defined between the inner periphery of the second piston 22 and the case 8. A radially extending cut 22a is formed on a reservoir second chamber side surface (upper side surface in FIG. 3) of the second piston 22.

When the second piston 22 moves to a contraction-side second chamber side (lower side in FIG. 3), a side surface (lower side surface in FIG. 3) opposite to the cut 22a is seated on the case 8 to close the second damping flow passage M2. When the second piston 22 moves to a reservoir second chamber side (upper side in FIG. 3), the side surface opposite to the cut 22a is separated from the case 8 to open the second damping flow passage M2. That is, the second piston 22 functions as a third check valve V3 for opening the second damping flow passage M2 only when the working fluid moves from the contraction-side second chamber b2 (contraction-side chamber B) to the reservoir second chamber a2 (reservoir R).

The abutment portion (not shown) of the second piston 22 functions as the second damping flow passage M20 (FIG. 1) which constantly allows the communication between the contraction-side chamber B and the reservoir R and applies resistance when the working fluid passes. Although the suspension device includes two second damping flow passages as just described and one second damping flow passage M20 can be opened and closed, one of the second damping flow passages M2, M20 may be omitted. For example, the second piston 22 may be formed into an annular shape to eliminate the abutment portion that serves as the second damping flow passage M20.

When the suspension device (suspension device main body F) extends, the extension-side chamber A is pressurized and the contraction-side chamber B is depressurized, whereby the partition wall body 20 (first check valve V1) and the first piston 11 (second check valve V2) close the first and second flow passages L1, L2 and the second piston 22 (third check valve V3) opens the second damping flow passage M2.

At this time, the working fluid in the extension-side chamber A moves to the contraction-side chamber B and the reservoir R through the first damping flow passages M1, M10 and the third damping flow passage M3. Further, in a chamber composed of the extension-side chamber A and the contraction-side chamber B, the working fluid of a volume (Y1−Y2) obtained by subtracting the volume of the hollow pipe 10 that has exited (this volume is called "Y2") from the volume of the extension-side second chamber a2 that has shrunk (this volume is called "Y1") becomes surplus. Thus, this surplus working fluid moves to the reservoir R through the second damping flow passages M2, M20.

When the suspension device (suspension device main body F) contracts, the contraction-side chamber B is pressurized and the extension-side chamber A is depressurized, whereby the partition wall body 20 (first check valve V1), the first piston 11 (second check valve V2) and the second piston 22 (third check valve V3) open the first flow passage L1, the second flow passage L2 and the second damping flow passage M2.

At this time, the working fluid in the contraction-side chamber B moves to the extension-side chamber A and the reservoir R through the second flow passage L2, the first damping flow passages M1, M10 and the second damping flow passages M2, M20 and the working fluid in the reservoir R moves to the extension-side chamber A through the first flow passage L1 and the third damping flow passage M3. Further, in the chamber composed of the extension-side chamber A and the contraction-side chamber B, the working fluid of a volume (Y3−Y4) obtained by subtracting the volume of the hollow pipe 10 that has entered (this volume is called "Y4") from the volume of the extension-side second chamber a2 that has expanded (this volume is called "Y3") and the working fluid of a volume that have moved to the reservoir R through the second damping flow passages M2, M20 become insufficient. Thus, the working fluid corresponding to this shortage moves to the extension-side chamber A through the first flow passage L1 and the third damping flow passage M3.

That is, the suspension device can generate a damping force due to resistance produced when the working fluid passes through the first flow passage L1, the second flow passage L2, the first damping flow passages M1, M10, the second damping flow passages M2, M20 and the third damping flow passage M3 according to extending and contracting movements.

Next, functions and effects of the suspension device in the present embodiment are described. In the suspension device, the partition wall body 20 partitioning between the reservoir first chamber r1 and the extension-side first chamber a1 and the first piston 11 partitioning between the extension-side first chamber a1 and the contraction-side first chamber b1 are arranged between the inner periphery of the inner tube 2 and the outer periphery of the hollow pipe 10, the second piston 22 partitioning between the contraction-side second chamber b2 and the reservoir second chamber r2 is arranged between the inner periphery of the hollow pipe 10 and the outer periphery of the rod 21, and the partition wall body 20, the first piston 11 and the second piston 22 are each formed into an annular shape. Since the partition wall body 20, the first piston 11 and the second piston 22 are mounted movably in the axial direction and include the cuts 20c, 11a, 22a on one surface, the partition wall body 20, the first piston 11 and the second piston 22 can be caused to respectively function as the first, second and third check valves V1, V2 and V3 and a leaf valve can be eliminated.

The extension-side second chamber a2 that is the overlapping part of the outer tube 1 and the inner tube 2 and formed between the outer tube 1 and the inner tube 2 and expands and shrinks as the suspension device main body F contracts and extends forms the extension-side chamber A together with the extension-side first chamber a1, and the cross-sectional area X1 of the extension-side second chamber a2 is set to be larger than the cross-sectional area X2 of the hollow pipe 10 (X1>X2). Since this causes the working fluid in the contraction-side chamber B to become surplus also at the time of the extension of the suspension device during which the contraction-side chamber B is depressurized, an inner pressure of the contraction-side chamber B quickly increases when the movement of the suspension device is switched from the extending movement to the contracting movement. Further, since the interior of the hollow pipe 10 is partitioned by the second piston 22, a differential pressure between the reservoir R and the contraction-side chamber B at the time of contraction becomes larger than before and a shortage of a contraction-side damping force can be suppressed.

Furthermore, since being formed between the outer and inner bearings 14, 24, the extension-side second chamber a2 can expand and shrink as the suspension device main body F contracts and extends and sliding surfaces between the outer and inner bearings 14, 24 can be lubricated by the working fluid.

Furthermore, the suspension device includes the second flow passage L2 allowing the communication between the extension-side chamber A and the contraction-side chamber B and the second check valve V2 (FIG. 1) for opening the second flow passage L2 only when the working fluid moves from the contraction-side chamber B to the extension-side chamber A. This can cause the working fluid in the contraction-side chamber B to quickly move to the extension-side chamber A through the second flow passage L2 when the suspension device contracts, and can suppress an excessive increase of the contraction-side damping force.

Furthermore, the suspension device includes the third check valve (second piston 22) for opening the second damping flow passage M2 only when the working fluid moves from the contraction-side chamber B to the reservoir R. This can suppress a movement of the working fluid from the reservoir R to the contraction-side chamber B and suppress the flow of the gas in the reservoir R into the contraction-side chamber B.

Furthermore, the partition wall body 20, the first piston 11 and the second piston 22 are each formed into an annular shape and mounted movably in the axial direction, the cuts 20c are formed on the extension-side first chamber side surface 20b of the partition wall body 20, the cut 11a is formed on the extension-side first chamber side surface of the first piston 11 and the cut 22a is formed on the reservoir second chamber side surface of the second piston 22. Further, the first flow passage L1 is formed on the outer periphery of the partition wall body 20, the second flow passage L2 is formed on the inner periphery of the first piston 11 and the second damping flow passage M2 is formed on the inner periphery of the second piston 22.

In this way, the partition wall body 20, the first piston 11 and the second piston 22 can be caused to respectively function as the first, second and third check valves V1, V2 and V3 by causing the surfaces of the partition wall body 20, the first piston 11 and the second piston 22 opposite to the cuts 11a, 20c and 22a to be seated on and separated from the flange portion 5b of the case 5, the hollow pipe 10 and the case 8.

Furthermore, since the partition wall body 20, the first piston 11 and the second piston 22 are each formed into an annular C shape including the abutment portion, the partition wall body 20, the first piston 11 and the second piston 22 can be respectively easily mounted on the inner tube 2, the hollow pipe 10 and the rod 21.

Embodiments of the present invention were described above, but the above embodiments are merely examples of applications of the present invention, and the technical scope of the present invention is not limited to the specific constitutions of the above embodiments.

For example, although the suspension device has been illustrated to be a front fork in the above embodiment, it may be a rear cushion unit for suspending a rear wheel of a motorcycle or may be a suspension device for transportation equipment such as automotive vehicles other than motorcycles.

Furthermore, although the rod 21 is formed to be solid in the above embodiment, it may be formed to be hollow.

Furthermore, the configurations of the partition wall body 20, the first piston 11, the second piston 22, the first flow passage L1, the second flow passage L2, the first damping flow passages M1, M10, the second damping flow passages M2, M20, the first check valve V1, the second check valve V2 and the third check valve V3 are not limited to those illustrated in the above embodiment and other various configurations can be adopted. For example, the second damping flow passages M2, M20 in the above embodiment may be changed to those as shown in FIGS. 5A and 5B.

Figure 5A:
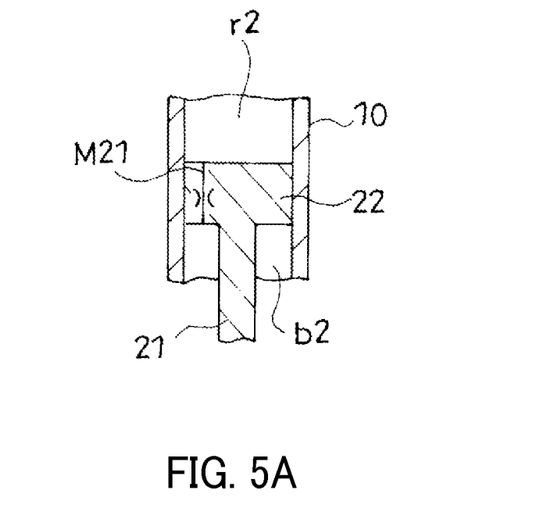
FIG. 5A is a vertical sectional view enlargedly showing a second piston part.

FIG. 5A shows a first modification of the second damping flow passage. A second damping flow passage M21 is formed of one throttle flow passage formed on the second piston 22. In this case, a clearance formed between the second piston 22 and the hollow pipe 10 can be utilized as the second damping flow passage M21.

Figure 5B:
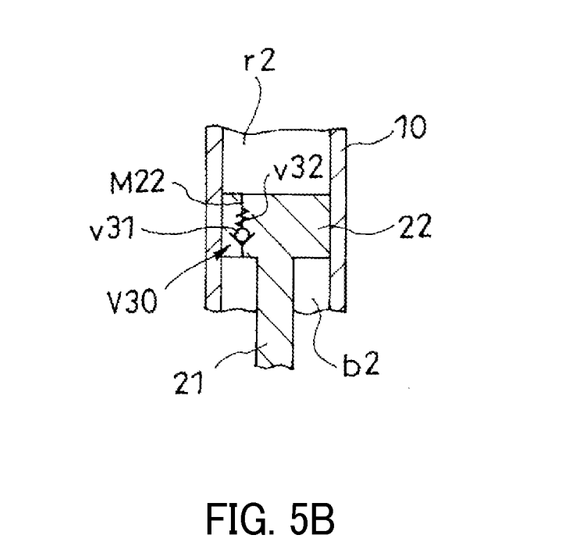
FIG. 5B is a vertical sectional view enlargedly showing the second piston part.

FIG. 5B shows a second modification of the second damping flow passage. A damping valve V30 including a valve body v31 for opening and closing the second damping flow passage M22 and a spring v32 for biasing the valve body v31 in a closing direction is provided at an intermediate position of a second damping flow passage M22. The damping valve V30 opens the second damping flow passage M22 only when the working fluid moves from the contraction-side chamber B to the reservoir R. In this case, even if the second damping flow passage M22 is not formed as a throttle flow passage, resistance can be applied to the working fluid moving from the contraction-side chamber B to the reservoir R through the second damping flow passage M22. Further, the resistance applied to the working fluid can be changed by replacing the spring v32.

This application claims priorities based on Japanese Patent Application No. 2012-102761 filed with the Japan Patent Office on Apr. 27, 2012, and Japanese Patent Application No. 2013-030770 filed with the Japan Patent Office on Feb. 20, 2013, the entire contents of which are incorporated into this specification.

The invention claimed is:

1. A suspension device with a telescopic suspension device main body including an outer tube which is to be coupled to a vehicle body side and an inner tube which is to be coupled to a wheel side and a tip side of which is retractably inserted into the outer tube, comprising:
a hollow pipe a base end side of which is coupled to the outer tube and a tip side of which enters and exits from the inner tube as the suspension device main body contracts and extends;
a partition wall body which is held on the inner periphery of the tip side of the inner tube, slides in contact with the outer peripheral surface of the hollow pipe, and partitions the outside of the hollow pipe into a working chamber which is filled with working fluid and formed inside the inner tube and a reservoir first chamber in which the working fluid is stored;
a first piston which is held on the outer periphery of the tip side of the hollow pipe, slides in contact with the inner peripheral surface of the inner tube and partitions the working chamber into an extension-side first chamber on a hollow pipe side and a contraction-side first chamber;
a first flow passage which allows communication between the extension-side first chamber and the reservoir first chamber;
a first check valve which opens the first flow passage only when the working fluid moves from the reservoir first chamber to the extension-side first chamber;
an extension-side second chamber which is formed between the outer tube and the inner tube in an overlapping part of the outer tube and the inner tube, is filled with the working fluid, communicates with the extension-side first chamber and expands and shrinks as the suspension device main body contracts and extends;
a rod a base end side of which is coupled to the inner tube and a tip side of which enters and exits from the hollow pipe as the suspension device main body contracts and extends;

a second piston which is held on the outer periphery of the tip side of the rod and partitions the interior of the hollow pipe into a contraction-side second chamber which is filled with the working fluid and communicates with the contraction-side first chamber and a reservoir second chamber in which the working fluid is stored and which communicates with the reservoir first chamber;

a first damping flow passage which allows communication between an extension-side chamber including the extension-side first chamber and the extension-side second chamber and a contraction-side chamber including the contraction-side first chamber and the contraction-side second chamber and applies resistance when the working fluid passes; and a second damping flow passage which allows communication between the contraction-side chamber and a reservoir including the reservoir first chamber and the reservoir second chamber and applies resistance when the working fluid passes;

a cross-sectional area of the extension-side second chamber being larger than that of the hollow pipe.

2. The suspension device according to claim 1, further comprising:

a second flow passage which allows the communication between the extension-side chamber and the contraction-side chamber; and a second check valve which opens the second flow passage only when the working fluid moves from the contraction-side chamber to the extension-side chamber.

3. The suspension device according to claim 1, further comprising:

a third check valve which opens the second damping flow passage only when the working fluid moves from the contraction-side chamber to the reservoir.

4. The suspension device according to claim 3, wherein:

the partition wall body, the first piston and the second piston are each formed into an annular shape and mounted movably in an axial direction, and a cut is formed on each of an extension-side first chamber side surface of the partition wall body, an extension-side first chamber side surface of the first piston and a reservoir second chamber side surface of the second piston; and the first flow passage is formed on the outer periphery of the partition wall body, the second flow passage is formed on the inner periphery of the first piston and the second damping flow passage is formed on the inner periphery of the second piston.

* * * * *